(12) United States Patent
Aftanas

(10) Patent No.: US 7,044,345 B2
(45) Date of Patent: May 16, 2006

(54) SINGLE SIDED RELEASEABLE ARTICLE CARRIER USING LEAF SPRING

(75) Inventor: Jeffrey M Aftanas, Ortonville, MI (US)

(73) Assignee: JAC Products, Inc., Saline, MI (US)

( * ) Notice: Subject to any disclaimer, the term of this patent is extended or adjusted under 35 U.S.C. 154(b) by 51 days.

(21) Appl. No.: 10/366,184

(22) Filed: Feb. 13, 2003

(65) Prior Publication Data

US 2003/0160077 A1    Aug. 28, 2003

Related U.S. Application Data

(60) Provisional application No. 60/359,515, filed on Feb. 25, 2002.

(51) Int. Cl.
*B60R 9/45* (2006.01)

(52) U.S. Cl. ...................... 224/321; 224/322

(58) Field of Classification Search ................ 224/325, 224/321, 322 X, 324, 323
See application file for complete search history.

(56) References Cited

U.S. PATENT DOCUMENTS

| | | | |
|---|---|---|---|
| 2,688,504 A * | 9/1954 | Parker | ......................... 410/105 |
| 3,253,755 A | 5/1966 | Bot | |
| 3,545,660 A | 12/1970 | Stephen | |
| 3,554,416 A * | 1/1971 | Bott | ............................ 224/321 |
| 4,294,388 A | 10/1981 | Wunstel | |
| 4,684,048 A | 8/1987 | Bott | |
| 4,754,905 A | 7/1988 | Bott | |
| 4,877,168 A | 10/1989 | Bott | |
| 4,899,917 A | 2/1990 | Bott | |
| 4,972,983 A | 11/1990 | Bott | |
| 4,982,886 A | 1/1991 | Cucheran | |
| 5,082,158 A | 1/1992 | Bott | |
| 5,104,019 A | 4/1992 | Bott | |
| 5,174,484 A | 12/1992 | Bott | |
| 5,190,198 A * | 3/1993 | Cucheran | ..................... 224/321 |
| 5,226,570 A | 7/1993 | Pedrini | |
| 5,456,512 A | 10/1995 | Gibbs et al. | |
| 5,579,970 A * | 12/1996 | Cucheran et al. | ............ 224/321 |
| 5,588,572 A | 12/1996 | Cronce et al. | |
| 5,715,980 A * | 2/1998 | Blankenburg et al. | ....... 224/321 |
| 5,794,827 A * | 8/1998 | Cucheran et al. | ............ 224/321 |
| 5,826,766 A * | 10/1998 | Aftanas | ....................... 224/321 |

(Continued)

FOREIGN PATENT DOCUMENTS

WO    WO 90/02668    3/1990

(Continued)

*Primary Examiner*—Tri M. Mai
(74) *Attorney, Agent, or Firm*—Harness Dickey & Pierce P.L.C.

(57) ABSTRACT

A vehicle article carrier incorporating a single sided releasable cross bar. The cross bar has an end support secured at each outermost end thereof. Each end support lockably engages with an associated side rail. Each end support includes an actuating member which cammingly urges a locking member into and out of engagement with interior wall surfaces of its associated side rail when the actuating member is moved between locked and unlocked positions. A biasing member in the form of a leaf spring is used to bias the locking member into a normally locked position. A pair of small diameter rods coupled to each actuating member of the cross bar allow the locking members of the two end supports to be simultaneously locked and unlocked by movement of either one of the actuating members.

20 Claims, 14 Drawing Sheets

U.S. PATENT DOCUMENTS 5,924,614 A * 7/1999 Kuntze et al. .............. 224/321
6,015,075 A    1/2000 Stapleton
6,050,467 A    4/2000 Drouillard et al.
6,068,169 A    5/2000 Aftanas
6,112,964 A * 9/2000 Cucheran et al. ........... 224/321
6,131,782 A * 10/2000 De Silva et al. ............ 224/321
6,216,928 B1 * 4/2001 Blankenburg et al. ...... 224/321
2003/0066852 A1 * 4/2003 Aftansas et al. ............ 224/321

FOREIGN PATENT DOCUMENTS

WO    WO 94/10007    5/1994

* cited by examiner

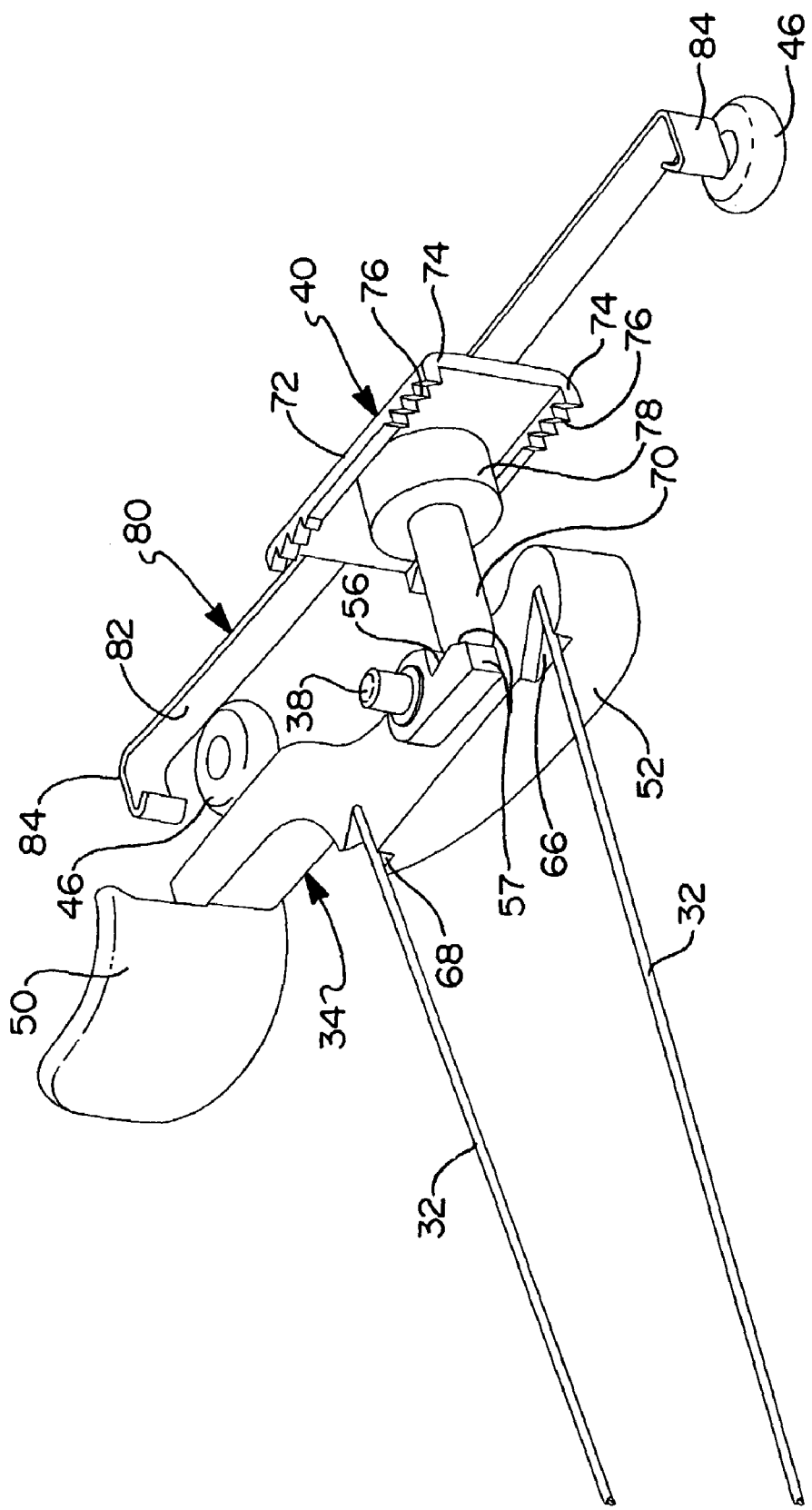

SINGLE SIDED RELEASEABLE ARTICLE CARRIER USING LEAF SPRING

CROSS-REFERENCE TO RELATED APPLICATIONS

This application claims the benefit of U.S. Provisional Application No. 60/359,515, filed on Feb. 25, 2002. The disclosure(s) of the above application(s) is (are) incorporated herein by reference.

FIELD OF THE INVENTION

This invention relates to vehicle article carrier systems, and more particularly to a vehicle article carrier system having a single sided releasable cross bar for allowing opposite ends of the cross bar to be simultaneously locked and unlocked from either one of a pair of end supports disposed at the opposite ends of the cross bar.

BACKGROUND OF THE INVENTION

Vehicle article carriers are used in a wide variety of applications to store articles above an outer body surface of a car, mini van, station wagon, sport utility vehicle, and even some trucks. Such vehicle article carriers typically include a pair of side rails which are fixedly secured to the outer body surface along a major longitudinal length of the outer body surface. At least one cross bar is secured between the side rails, and more typically a pair of cross bars are secured between the side rails. If a pair of cross bars is incorporated, typically one can be adjustably positioned at a desired position along the side rails to better support articles of various sizes thereon.

Recently, manufacturers have been focusing more and more on cross bars which incorporate a single sided release feature. By this it is meant that the opposite ends of the cross bar which are secured to the side rails can be locked and unlocked from one end of the cross bar. This is typically accomplished through some reasonably complex mechanism formed in each end support disposed at each end of the cross bar. Often a cable or spring extends through the interior of the cross bar, which is typically tubular in construction, such that movement of one actuating member at one end of the cross bar simultaneously actuates the locking mechanism at the opposite end of the cross bar, to thus allow both ends of the cross bar to be simultaneously locked and unlocked. Traditionally, such single sided release mechanisms as described above have been reasonably complex in construction. Furthermore, such single sided releasable cross bars have required somewhat complex assembly procedures. The number of independent components typically employed with previously developed single sided releasable systems often makes them somewhat susceptible to the elements such as rain, sleet, dust and dirt, which have the potential to interfere with proper working movement of their interior components.

In view of the foregoing, it is a principal object of the present invention to provide a single sided releasable cross bar having a uniquely simple construction which requires fewer independent component parts than previously developed systems.

More particularly, it is a principal object of the present invention to provide a single sided releasable cross bar having a pair of end supports in which each end support incorporates a camming structure, a robust locking member and a robust biasing element which can be moved between locked and unlocked positions through a camming action when an actuating member of one or the other of the end supports is moved between locked and unlocked positions. It is still a further object of the present invention to provide such a vehicle article carrier which incorporates a means for operatively coupling the mechanisms in each of the end supports of the cross bar, and wherein the means for coupling the mechanisms is very robust and provides for reliable, simultaneous locking and unlocking of both of the end supports of a cross bar from a corresponding pair of side rails.

SUMMARY OF THE INVENTION

The above and other objects are met by a vehicle article carrier system in accordance with preferred embodiments of the present invention. The vehicle article carrier system includes a pair of support rails, which in one preferred form are elevated side rails fixedly disposed on an outer body surface of a vehicle such as a roof portion. At least one cross bar, and preferably a pair of cross bars, are disposed on the support rails, with at least one of the cross bars being capable of adjustable positioning along the support rails. The adjustable cross bar includes an end support at each outer end which can be lockably coupled to its associated support rail. Each end support includes an actuating member having a camming surface, a locking member and a biasing element for biasing the locking member into locking engagement with a surface of its associated support rail.

The actuating members of each end support are further coupled via at least one elongated coupling element, which in one preferred form comprises a relatively small diameter metal rod which extends through an interior area of the cross bar. More preferably, a pair of such metal rods are incorporated.

In a preferred embodiment, the locking member forms a tap plate having a plurality of serrated edges, and each support rail includes a channel within which the tap plate is disposed and where the serrated edges are able to engage interior surface portions of the channel when the tap plate is in a locked position.

The biasing mechanism incorporated is an elongated spring, and more preferably a thin elongated leaf spring. The leaf spring constantly urges the tap plate into engagement with the interior surface of walls of the channel of its associated support rail. When its associated actuating member is moved from a locked position to an unlocked position, the camming surface urges the locking member out of contact with the interior surface portions of the support rail against the force of the biasing spring. The actuating member at the opposite end of the cross rail is simultaneously moved because of the elongated coupling element extending between the two actuating members. This results in a simultaneous locking or unlocking of the end supports at the opposite ends of the cross bar. Thus, both end supports are simultaneously locked and unlocked when the user actuates either one of the actuating members.

The construction of each end support is robust and yet requires only a very limited number of independent component parts. It is therefore more resistant to contaminants and the elements that could adversely affect operation of previously developed forms of locking systems, which have a larger number of independent component parts.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 10 is a perspective view of an end portion of one of the coupling elements;

FIG. 11 is a perspective view of the internal components of the end support of FIG. 7 but without the end support housing;

DETAILED DESCRIPTION OF THE PREFERRED EMBODIMENTS

The following description of the preferred embodiment(s) is merely exemplary in nature and is in no way intended to limit the invention, its application, or uses.

Figure 1:
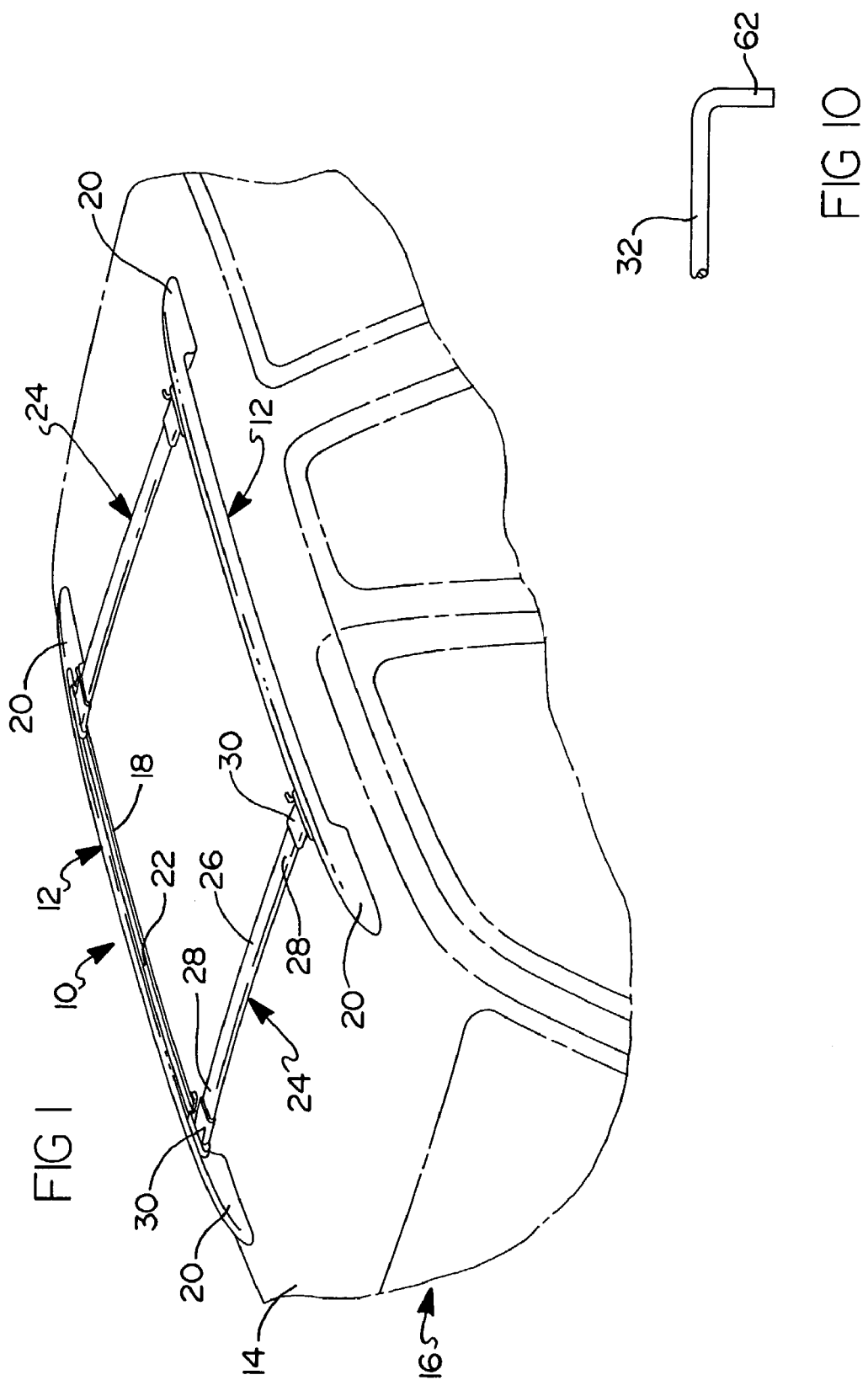
FIG. 1 is a perspective view of a vehicle article carrier system in accordance with a preferred embodiment of the present invention disposed on an outer body surface of a vehicle.

Referring to FIG. 1, there is shown a vehicle article carrier system 10 in accordance with a preferred embodiment of the present invention. The system 10 comprises a pair of support rails, which are illustrated as side rails 12, which are fixedly secured to an outer body surface 14 of a vehicle 16. The side rails 12 are secured generally parallel to one another and extend along a major longitudinal axis of the vehicle 16. Each side rail 12 includes a central portion 18 and a pair of support feet 20 which support the central portion 18 above the outer body surface 14. Each central portion 18 further includes a channel 22, the function of which will be described in greater detail momentarily.

The system 10 further includes at least one cross bar 24, and more preferably a pair of cross bars 24. In the illustration of FIG. 1, the cross bars 24 are shown as being identical and, in this example, both adjustably positionable along the central portion 18 of each side rail 12. However, one of the cross bars 24 could just as easily be fixedly secured to the side rails 12 so as to be not non-adjustable.

Each cross bar 24 includes a generally tubular cross bar member 26 having outermost ends 28. An end support 30 is disposed at each outermost end 28. The end supports 30 engage with the channels 22 in each side rail 12 to allow each cross bar 24 to be moved slidably along the central portions 18 of the side rails 12. This allows each cross bar 24 to be positioned to better support articles of various sizes thereon. Typically one or more tie down straps, such as rubber straps or bungee cords, are used in connection with the cross bars 24 to secure articles to the system 10.

Figure 2:
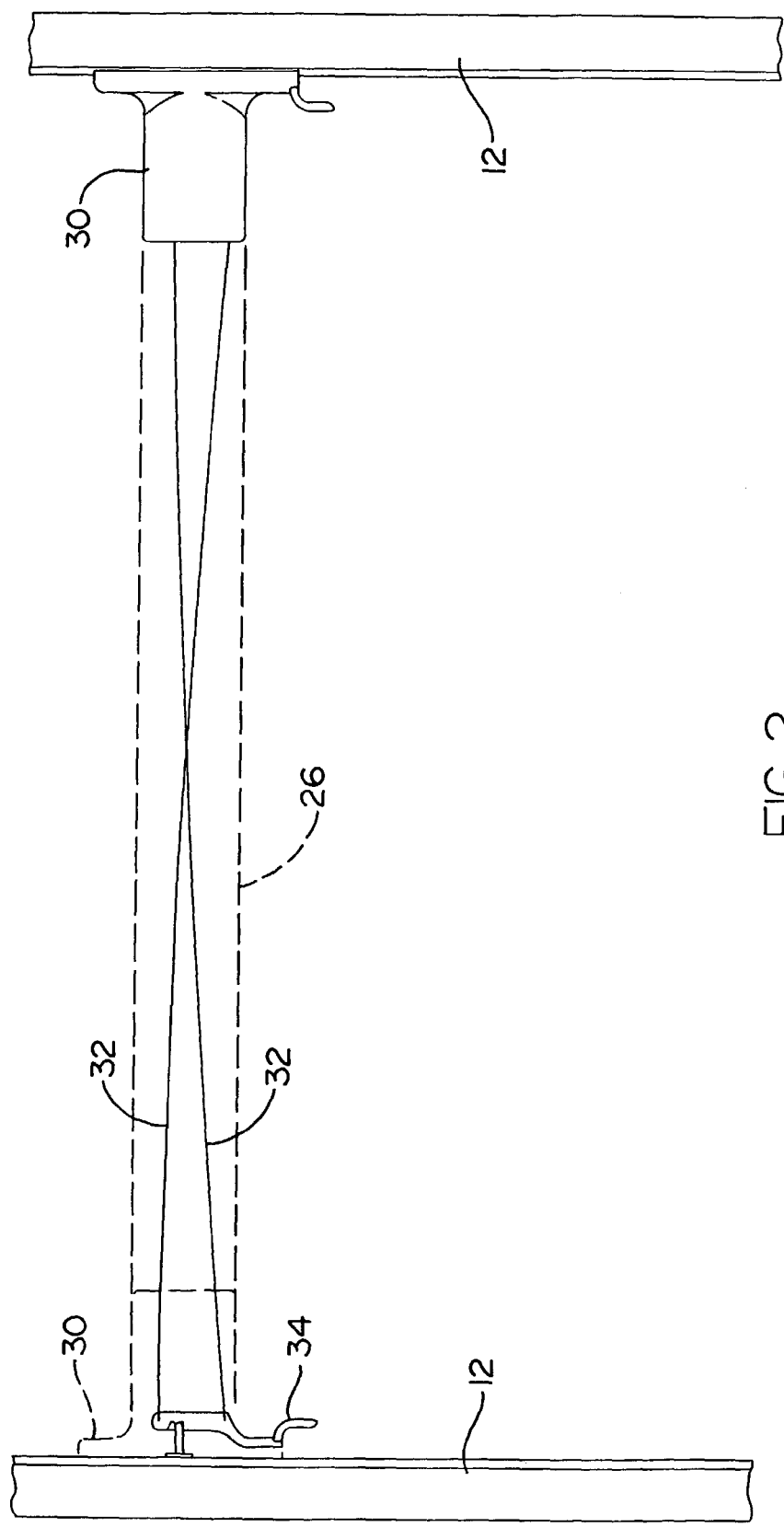
FIG. 2 is a plan view of a portion of the system of FIG. 1, but illustrating the coupling elements extending within the cross bar member, wherein the cross bar member is shown in phantom.
Figure 3:
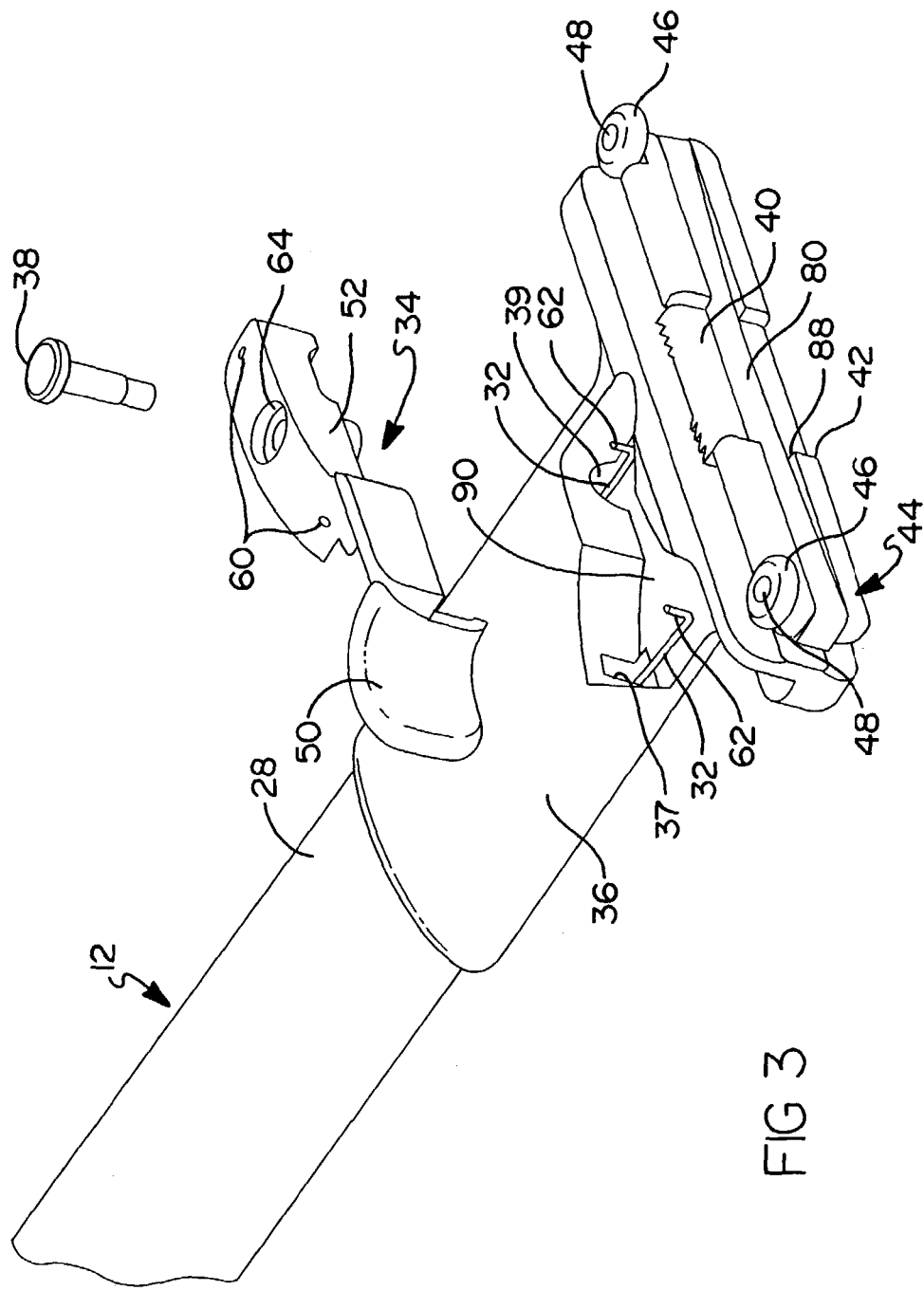
FIG. 3 is an exploded perspective view of the components of one of the end supports of the system.
Figure 4:
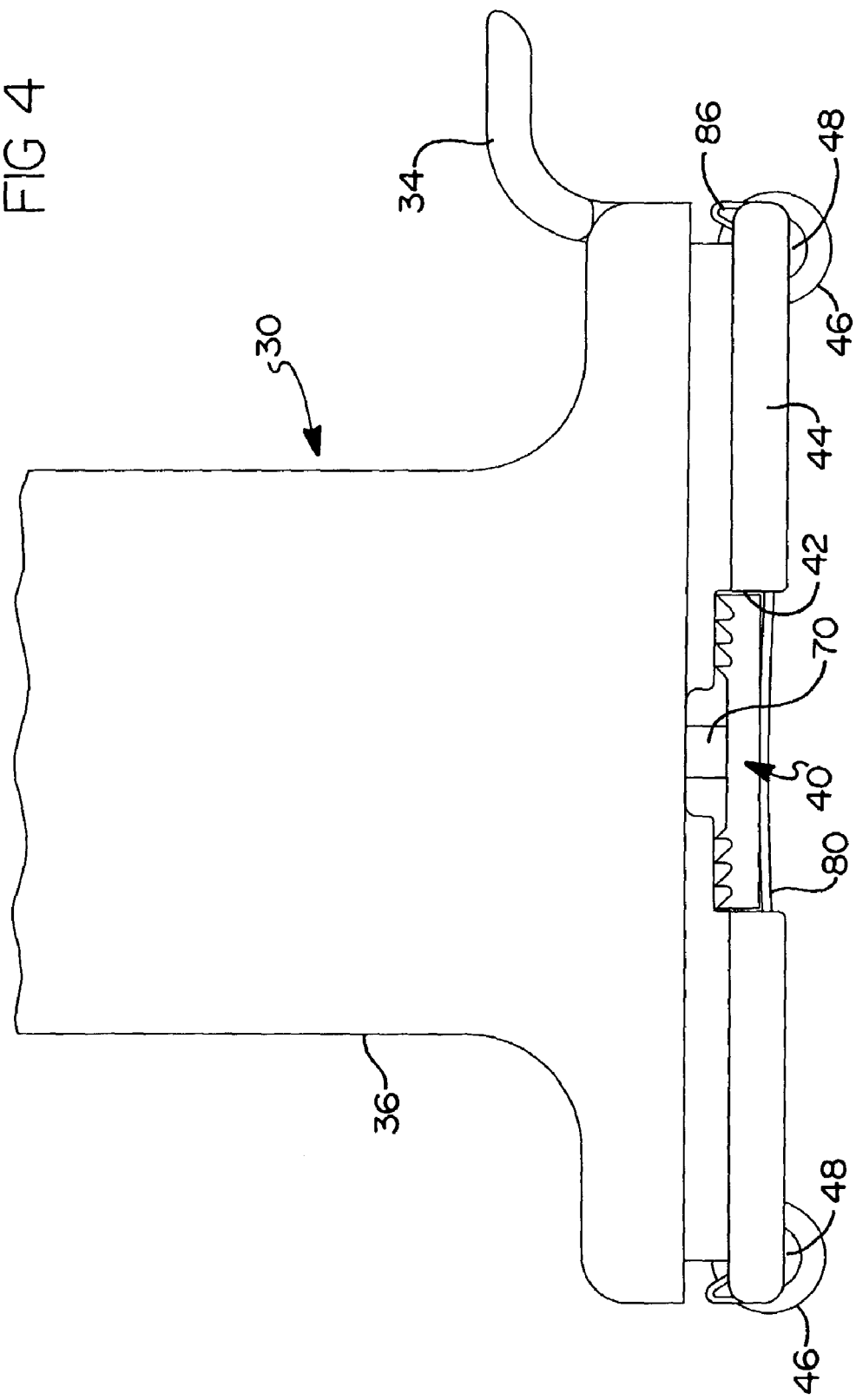
FIG. 4 is an enlarged plan view of one of the end supports with its locking member in a locked position.

Referring to FIG. 2, each cross bar 24 includes at least one elongated coupling element 32, and more preferably a pair of elongated coupling elements 32, extending through the interior area of the cross bar member 26. Each of the elongated coupling elements 32, in one preferred form, comprises a thin metal rod. Each end support 30 further includes a pivotally mounted actuating member 34, which will be described in greater detail momentarily, to which each of the coupling elements 32 are secured. It can be appreciated from the drawing of FIG. 2 that when one or the other of the actuating members 34 is moved pivotally, the actuating member at the opposite end of the cross bar 24 is also rotated by the movement of the coupling elements 32. Thus, moving either one of the actuating members 34 from a locked to an unlocked position causes the actuating member 34 at the opposite end support 30 to also be simultaneously moved into its unlocked position. Similarly, moving either of the actuating members 34 from an unlocked to a locked position will simultaneously cause the actuating member at the opposite end support 30 to also be moved into the locked position. The coupling elements 32 may vary significantly in diameter, but in one preferred form each have a diameter of about 2 mm.

Referring now to FIGS. 3–7, the construction of one of the end supports 30 can be seen in greater detail. Each end support 30 includes a housing 36 having passageways 37 and 39 through which portions of the coupling elements 32 extend. The ends of the coupling members 32 are adapted to be coupled to the actuating member 34, which in turn is pivotally secured via a pivot screw 38 to the housing 36. A locking member 40 is disposed within a cutout 42 of a T-lug portion 44 of the housing 36. The T-lug portion 44 is adapted to fit within the channel 22 in an associated one of the side rails 12 to prevent the end support 30 from being inadvertently removed from the side rail 12 and also to support the cross bar member 26 on the side rails 12. Each T-lug portion 44 includes a pair of wheels 46 which are secured for rotational movement by retaining members 48. The retaining members 48 may comprise any form of conventional threaded member or other element for securing the wheels 46 for rotational movement. The wheels 46 help to guide the T-lug portions 44 of each end support 30 along their respective channels 22 in the side rails 12 for smooth, non-binding movement.

Figure 6:
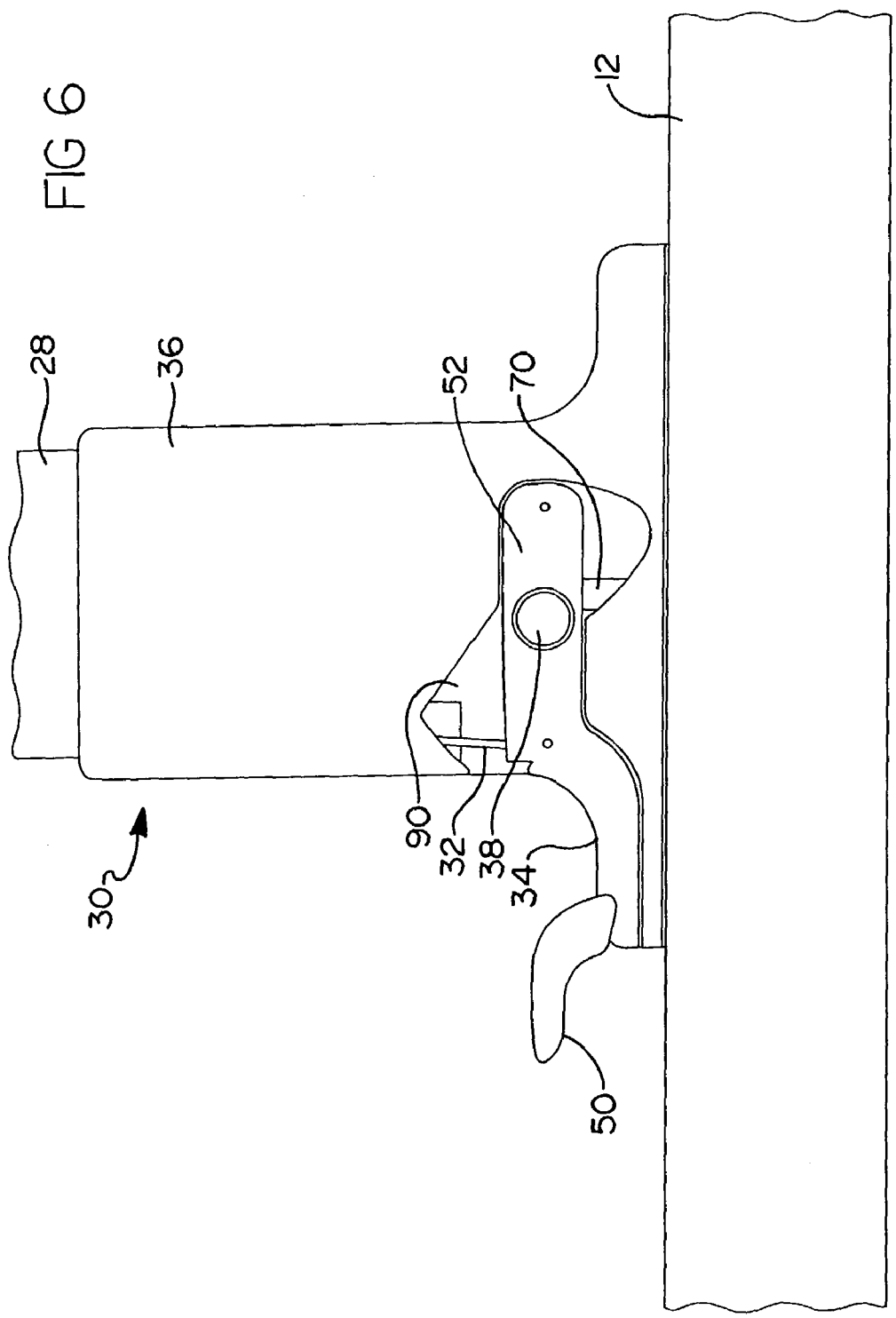
FIG. 6 is a bottom view of one of the end supports secured to an associated side rail of the system and in the locked position.
Figure 7:
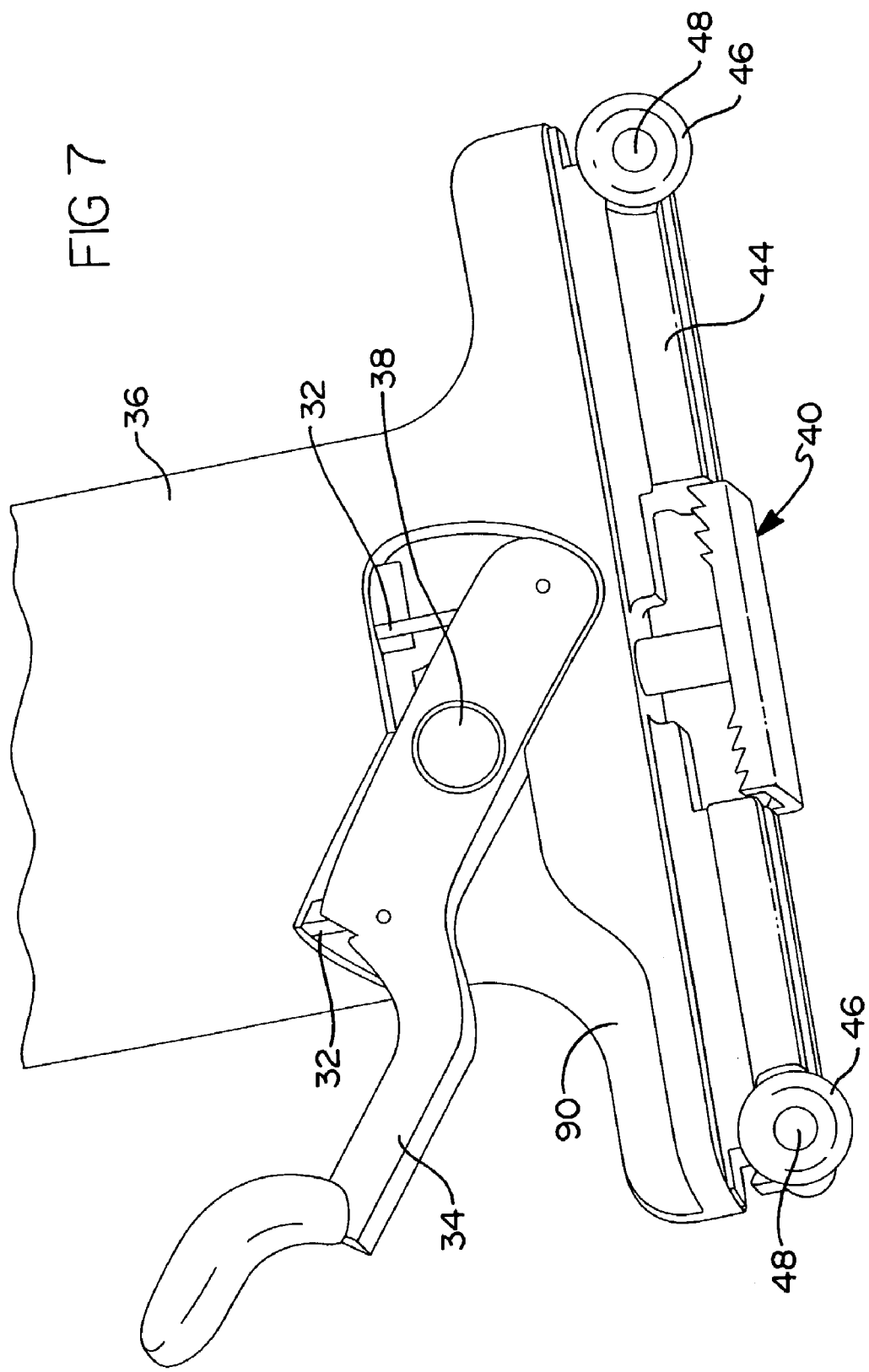
FIG. 7 is a perspective bottom view of just the end support of FIG. 6.
Figure 8:
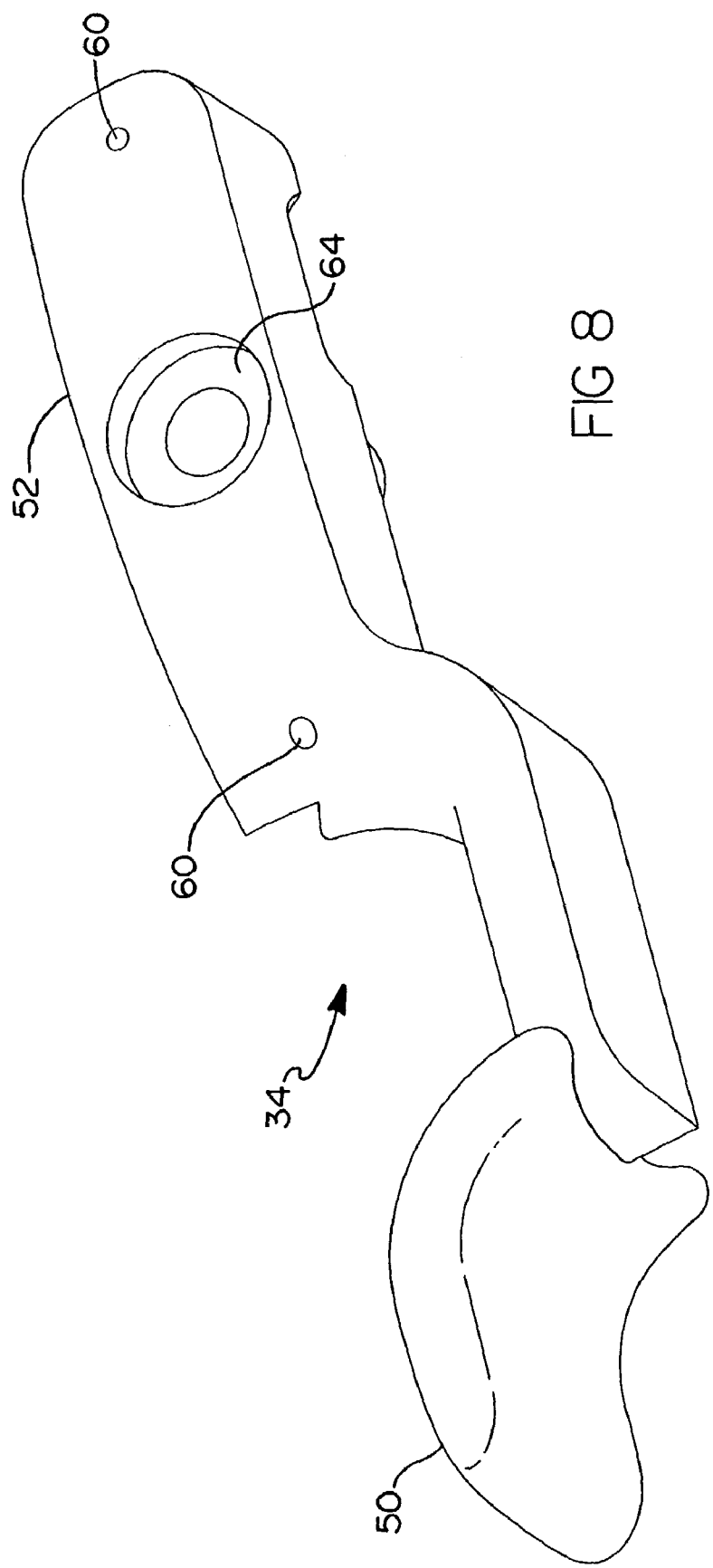
FIG. 8 is a perspective view of the actuating member.
Figure 9:
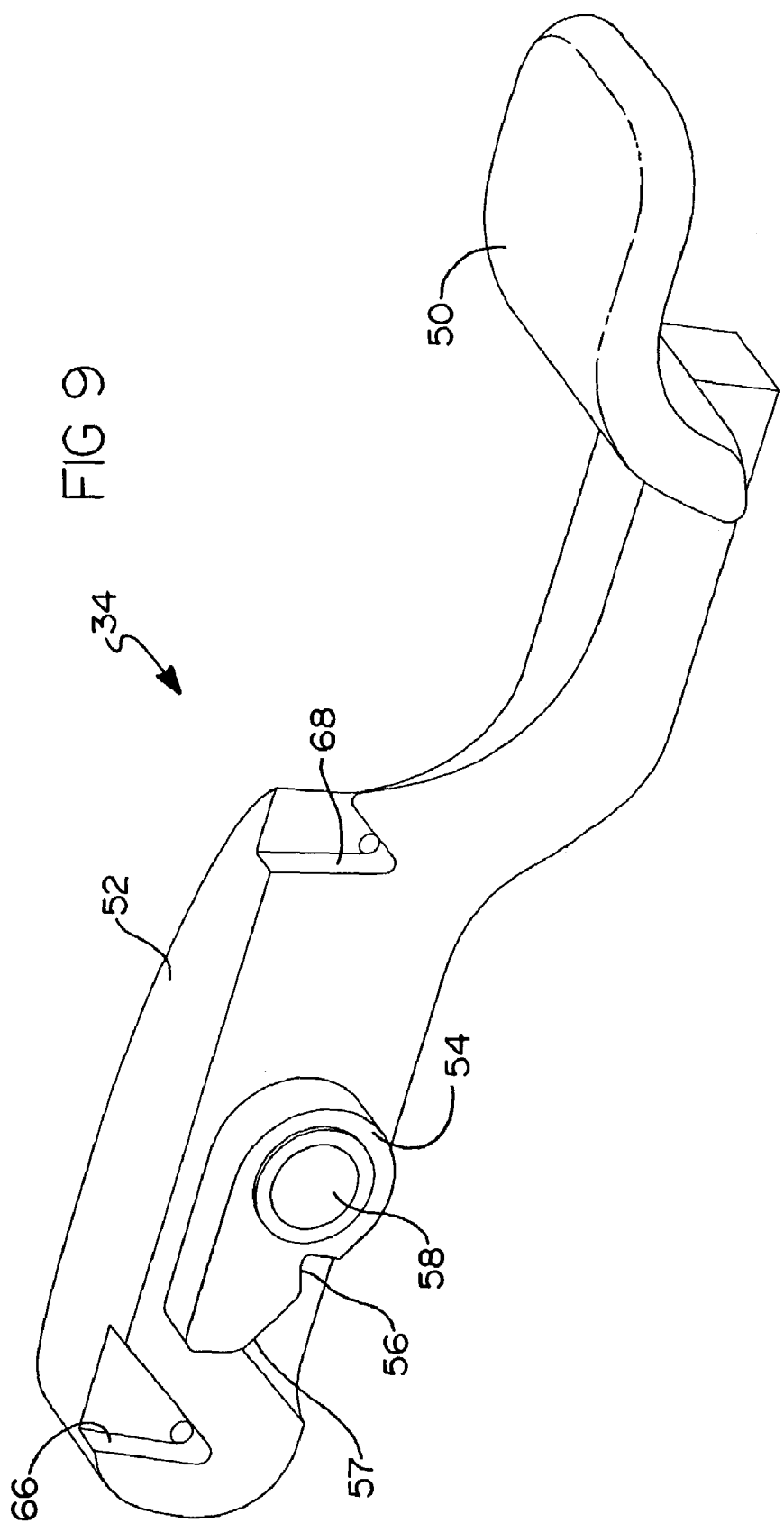
FIG. 9 is another perspective view of the actuating member of FIG. 8 but taken from the opposite side thereof.

Referring specifically to FIGS. 8 and 9, the actuating member 34 forms a lever having a manually graspable portion 50 and a base portion 52. The base portion 52 includes a boss portion 54 having camming surfaces 56 and 57. The boss portion 54 also includes a bore 58 for receiving the pivot screw 38, which allows the actuating member 34 to be mounted for pivotal movement. A pair of blind holes 60 receive L-shaped ends of each of the coupling elements 32, as shown in FIG. 10 and designated by reference numeral 62. The L-shaped ends 62 are captured in the blind holes 60 when the actuating member 34 is assembled to the housing 36 via the pivot screw 38, as best seen in FIGS. 6 and 7.

With further reference to FIGS. 8, 9 and 11, the actuating member 34 further includes a recessed area 64 for receiving a head portion of the pivot screw 38 (FIG. 8), and recessed portions 66 and 68 for receiving an outermost end of each coupling element 32. Each of the recesses 66 and 68 are somewhat triangular when viewed in plan form to thus provide the necessary clearance when the actuating lever 34 is rotated between its locked and unlocked positions.

With specific reference to FIG. 11, the locking member 40 can be seen in greater detail. The locking member 40 essentially forms a tap plate having a neck portion 70 and a generally planar head portion 72. The head portion 72 includes inwardly turned lip portions 74 which each include a plurality of serrated teeth 76. The serrated teeth 76 are preferably angled in a direction such that they are angled toward the front of the vehicle on which the article carrier system 10 is mounted when the cross bar 24 is installed on the side rails 12. In this manner, if the vehicle makes a sudden stop, the teeth 76 will tend to dig into the interior surfaces of the side rails 12 thus providing additional insurance that the cross bar 24 will not move forwardly when its end supports 30 are in their locked positions. The locking member 40 is further preferably formed as a single piece unit form a high strength metal such as aluminum or steel.

FIG. 11 further shows an optional boss portion 78 formed on the planar head portion 72. The optional boss portion 78 can be used to engage optional notches (not shown) formed in the central portion 18 of its associated side rail 12 to even more positively secure the end support 30 at a given position along the longitudinal length of its side rail. It will be appreciated, however, that if such a feature is included, then the cross bar 24 will not be infinitely adjustable along the side rails 12, but will rather be securable at one or more specific positions along the length of the side rails 12, in accordance with the specific positions of the notches. Without the boss portion 78, the end supports 30 may be secured at an infinite number of positions along the side rails 12.

Figure 5:
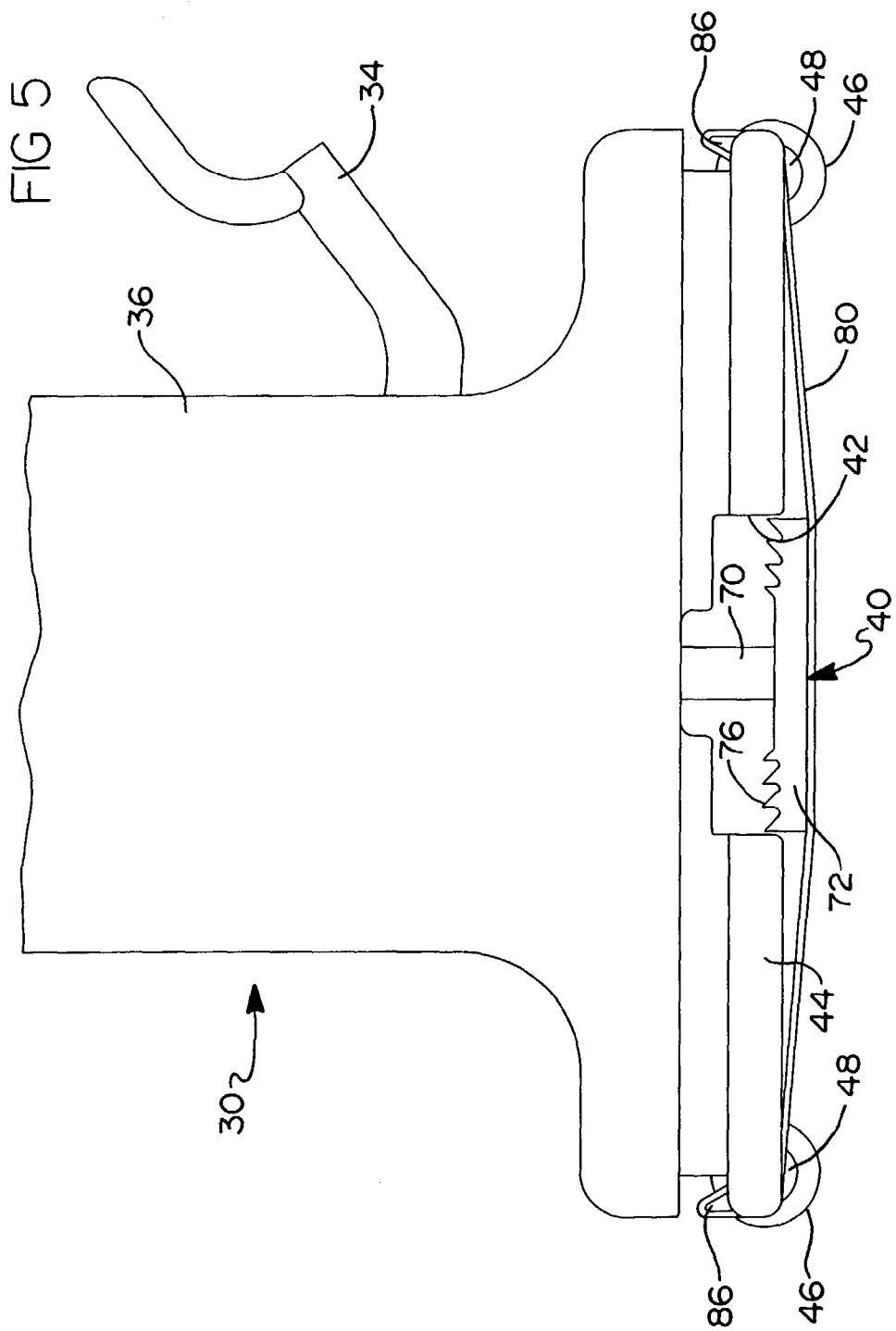
FIG. 5 is view of the end support of FIG. 4 but with the locking member thereof in the unlocked position.

With specific reference to FIGS. 5, 7 and 11, the neck portion 70 of the locking member 40 extends through a bore 79 in the end support housing 36 into contact with the camming surface 56. Each end support 30 further includes a biasing member 80 for urging the locking member 40 into a normally locked position. The biasing member 80 essentially forms a leaf spring having a main portion 82 and outermost end portions 84. The main portion 82 abuts the planar head portion 72 on the locking member 40 to provide a continuous biasing force there against. The biasing member 80 is installed on the T-lug portion 44 of the end support 30 such that it is "preloaded" against the biasing member 40 to thereby provide a continuous biasing force that tends to urge the locking member 40 into a locked position (i.e., towards the actuating member 34). The end portions 84 engage around protrusions 86 formed at opposite longitudinal ends of the T-lug portion 44 so that the biasing member 80 is captured on the T-lug portion 44. The main portion 82 on the biasing member 80 further fits within a channel 88 formed in the T-lug portion 44 so that the biasing member 80 cannot move off of the T-lug portion once installed thereon.

With brief reference to FIG. 7, the actuating member 34 can be seen in its open position. The housing 36 includes a relief portion 90 which allows the actuating member 34 to be installed such that it is flush with a lower surface 92 of the housing 36. The relief portion 90 further is shaped to allow the needed movement of the base portion 52 of the actuating member 34 as the actuating member is rotated between its locked and unlocked positions.

Figure 12:
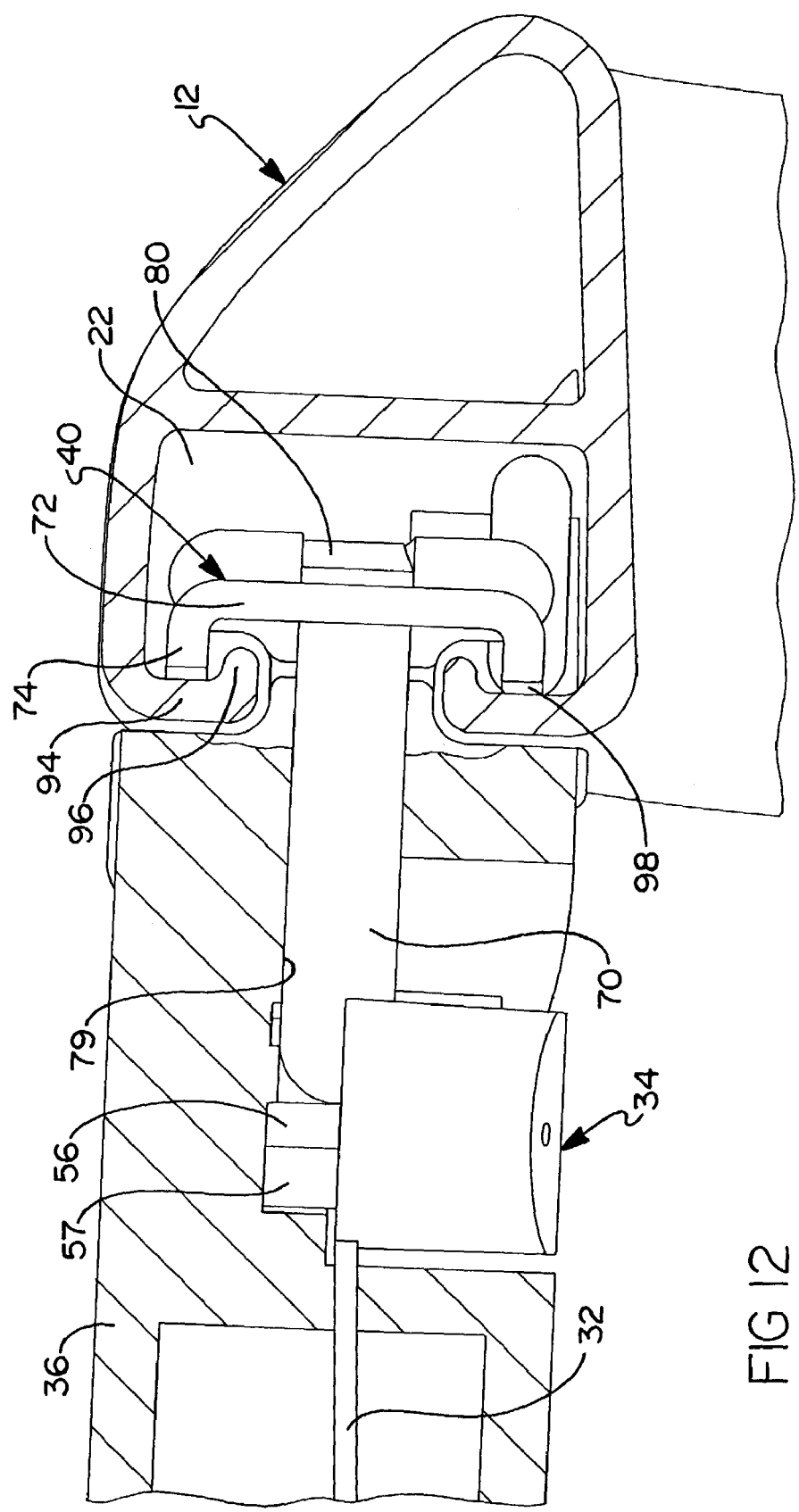
FIG. 12 is a partial cross sectional end view of the end support of FIG. 6 taken in accordance with section line 12—12 in FIG. 6.
Figure 13:
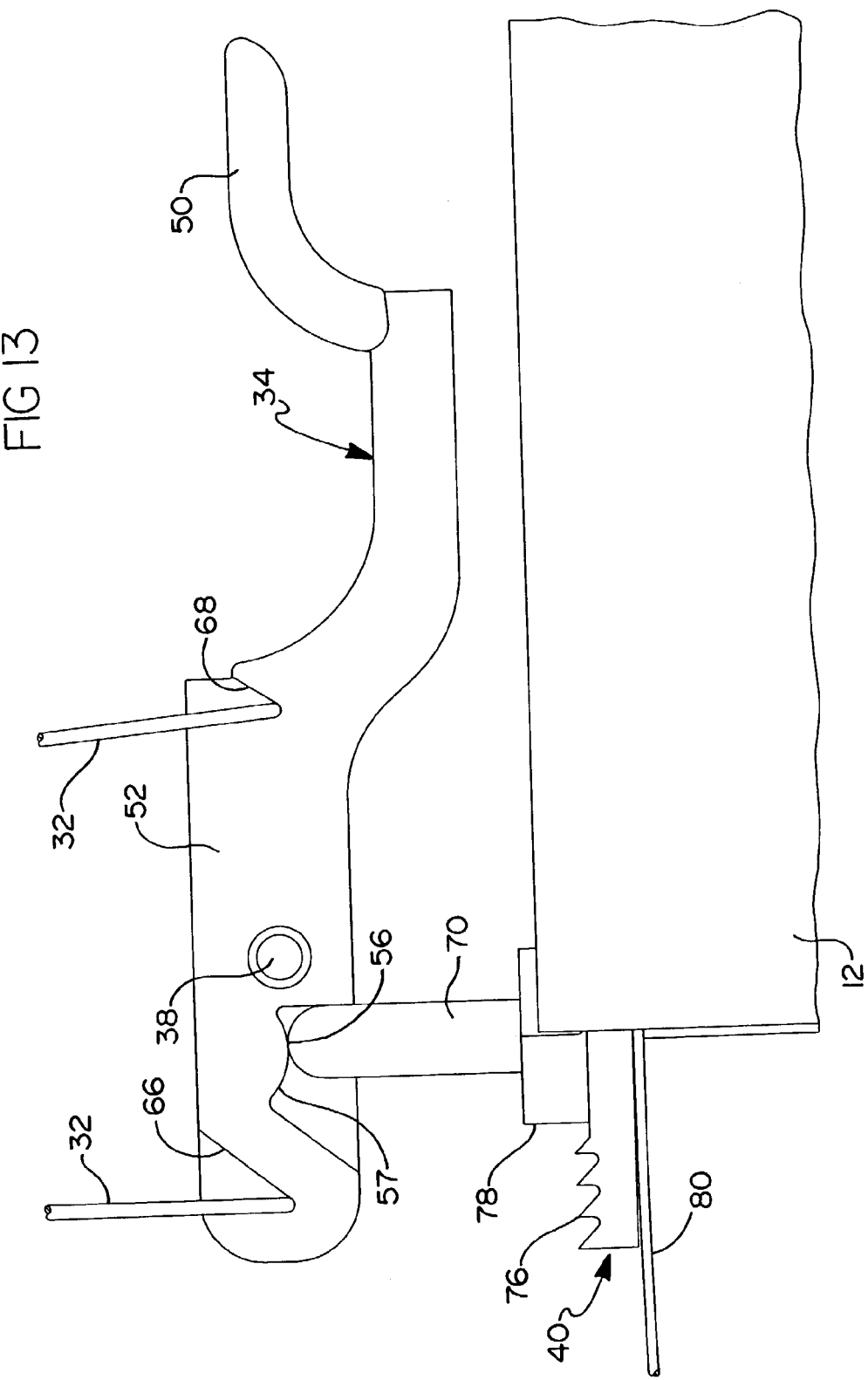
FIG. 13 is a plan view of the actuating member of one of the end supports in a locked position relative to its associated side rail.

Referring now to FIGS. 12–15, the operation of one of the end supports 30 will be described. It will be appreciated that since the construction of each end support 30 is identical, and further that since the actuating members 34 of each of the end supports 30 are coupled by the coupling elements 32, that movement of one of the actuating members 34 will cause a corresponding movement of the actuating member at the other end support 30. Referring specifically to FIGS. 12 and 13, the actuating member 34 is shown in its locked position. The channel 22 can also be seen to include a pair of inwardly turned lip portions 94 having edge portions 96. The teeth 76 of the locking member 40 engage with an inner surface 98 of each inwardly turned portion 94 to hold the locking member 40 at a desired longitudinal position when the actuating member 34 is in its locked position, as shown in FIG. 12. The edge portions 96 also cooperate with the lip portions 74 of the locking member to further help ensure that the locking member 40 cannot be withdrawn from the channel 22 in the event of a sudden applied force to the cross bar 24 which tends to pull the locking member out of the channel 22.

Figure 14:
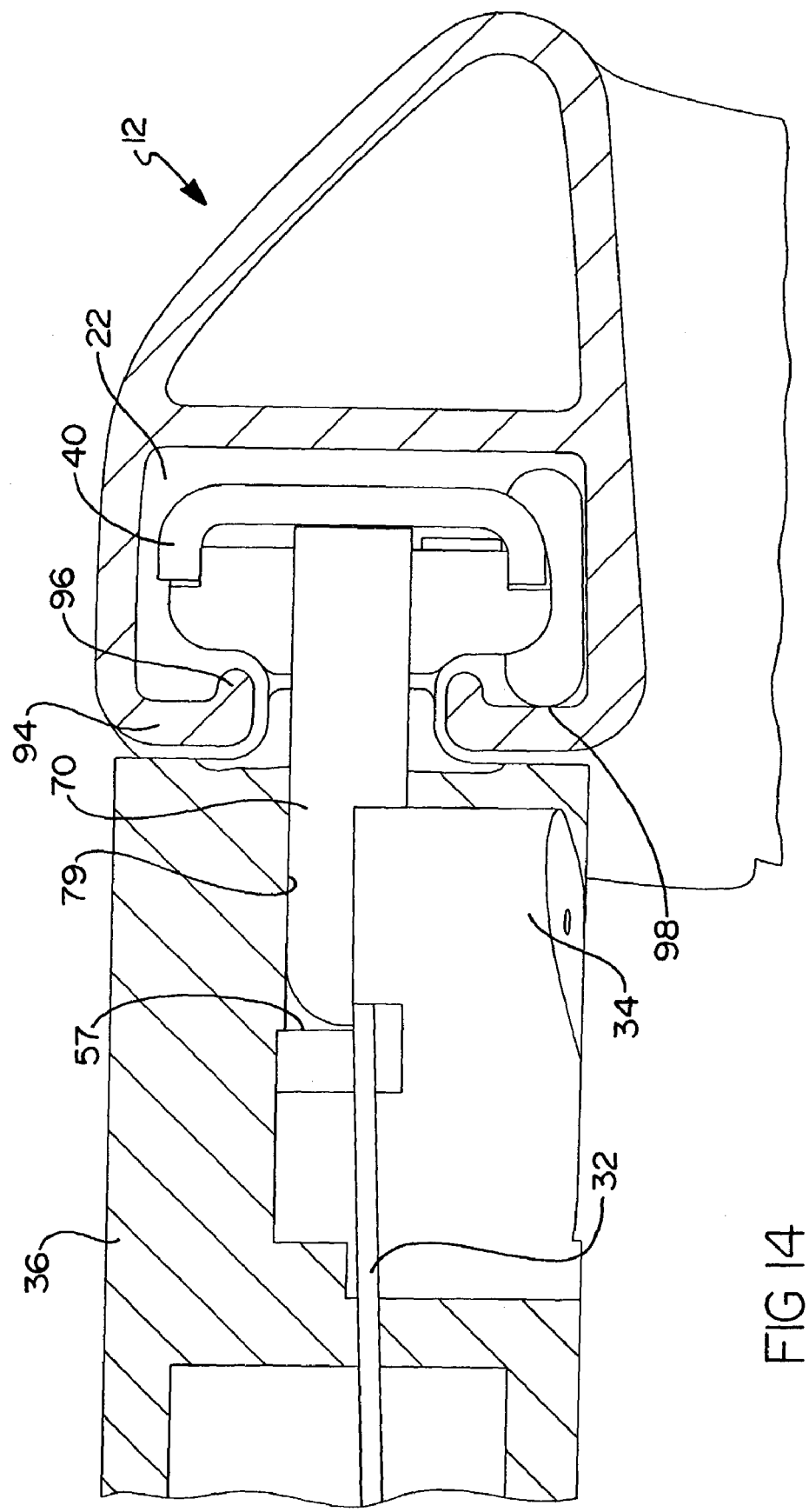
FIG. 14 is a view of the end support of FIG. 12 but with the actuating member in the unlocked position.
Figure 15:
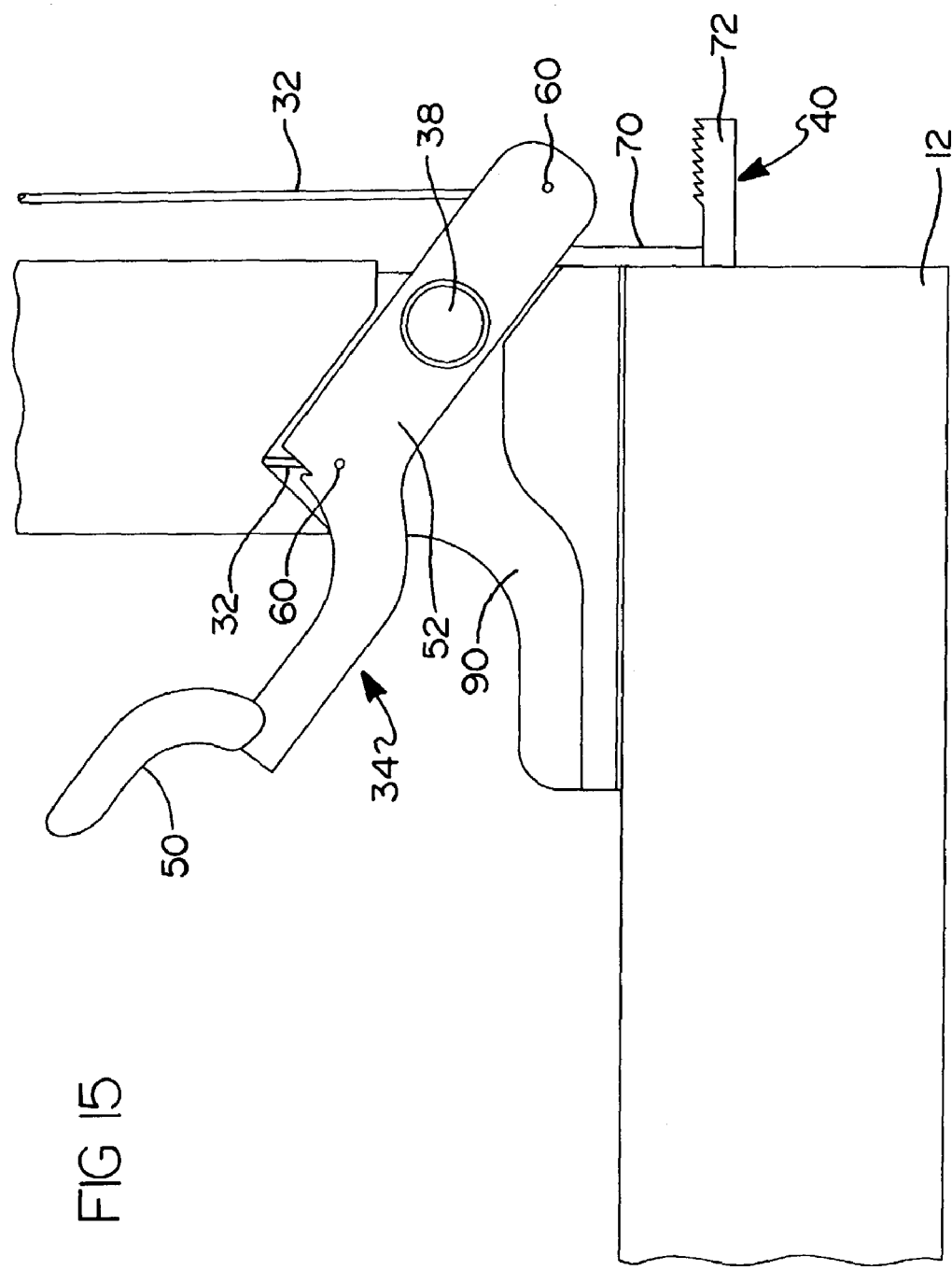
FIG. 15 is bottom view of one of the end supports with its actuating member in its unlocked position.

With reference to FIGS. 14 and 15, when the actuating member 34 is moved into its unlocked position, the camming surface 56 urges the neck portion 70 laterally to the right in the drawing of FIG. 14. This moves the locking member 40 out of engagement with the inner surface 98 of the inwardly turned lip portions 94 against the biasing force provided by the biasing member 80. As the actuating member 34 is moved into its fully unlocked position (as shown in FIG. 15), camming surface 57 (FIG. 11) engages the neck portion 70, thus holding the actuating member 34 in its fully unlocked position. The user can thus release the actuating member 34 and move the entire cross bar 24 slidably along the side rails 12 to the desired position. When the cross bar 24 is positioned at the newly desired position, the actuating member 34 can then be moved back into its locked position (FIGS. 12 and 13), whereby each end support 30 will be securely locked to its associated side rail 12.

The construction of each end support 30 is further accomplished with a very limited number of independent component parts. This helps to reduce the possibility of the elements, as well as dust and dirt, from interfering with proper operation of its internal components.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, specification and following claims.

What is claimed is:

1. A vehicle article carrier for supporting articles above an outer body surface of a vehicle, comprising:
   a pair of support rails each having a channel and being adapted to be secured to said outer body surface;
   at least one cross bar for supporting articles thereon, said cross bar having a pair of end supports at its outermost ends, said end supports adapted to engage with said support rails such that said cross bar is supported above said outer body surface;

each said end support having:
  a housing;
  an actuating member pivotally secured to said housing and moveable between a locked position and an unlocked position, said actuating member having a camming surface thereon;
  a locking member adapted to be disposed within said channel in an associated one of said channels, said locking member having a generally planar head portion having a surface adapted to engage a surface of its associated said support rail; and
  a generally linear biasing member for biasing said locking member into a normally locked position relative to its associated said channel;
wherein movement of one of said actuating members by a user from said locked position to said unlocked position causes its said camming surface to urge its associated said locking member into said unlocked position against a biasing force provided by its associated said biasing member; and
at least one coupling element extending along said cross bar and coupled to each of said actuating members for simultaneously urging said actuating member which is not being moved by said user into said unlocked position when said user moves the other one of said actuating members into said unlocked position, to thereby simultaneously unlock both of said end supports from their respective said support rails; and
wherein said generally planar head portion comprises a component having a plurality of angled serrated, teeth on one surface for engaging a portion of an associated one of said support rails.

2. The vehicle article carrier of claim 1, wherein said coupling element comprises a thin metal rod.

3. The vehicle article carrier of claim 1, said housing further comprising passageways through which a portion of said coupling element extends.

4. The vehicle article carrier of claim 1, said housing further comprising a T-lug portion having a cutout, said locking member being disposed within said cutout.

5. The vehicle article carrier of claim 1, said end support further comprising a T-lug portion, said T-lug portion adapted to fit within said channel to prevent said end support from being inadvertently removed from said support rail and to support said crossbar on said support rail.

6. The vehicle article carrier of claim 5, said T-lug portion further comprising at least two wheels to help guide said T-lug portion along said channel for smooth, non-binding movement.

7. The vehicle article carrier of claim 1, wherein said coupling element terminates in an L-shaped end at both a first end and a second end.

8. The vehicle article carrier of claim 7, said actuating member further comprising a blind hole that receives said L-shaped end.

9. The vehicle article carrier of claim 1, said locking member further comprising a neck portion coupled to said head portion.

10. The vehicle article carrier of claim 1, wherein said locking member is formed as a single piece unit from a high strength metal.

11. The vehicle article carrier of claim 1, said channel further comprising a pair of inwardly turned lip portions having edge portions, said serrated teeth contacting said inwardly turned lip portions to hold its associated said end support at a desired longitudinal position when said actuating member is in said locked position.

12. The vehicle article carrier of claim 1, said locking member further comprising a plurality of lip portions, said lip portions cooperating with edge portions of said channel to further help ensure that said locking member cannot be withdrawn from said channel in the event that a sudden force is applied to said crossbar.

13. A vehicle article carrier for supporting articles above an outer body surface of a vehicle, comprising:
  a pair of support rails each having a channel and being adapted to be secured to said outer body surface;
  at least one crossbar for supporting articles thereon, said crossbar having a first end support at a first outermost end and a second end support at a second outermost end; said first end support and said second end support each adapted to engage said support rails such that said crossbar is supported above said outer body surface between said support rails;
  at least one coupling element extending along said crossbar between said first end support and said second end support;
  a first housing associated with said first end support and a second housing associated with said second end support, said first and second housings each having at least one passageway, said coupling element extending through said passageways;
  a first actuating member pivotally secured to said first housing and a second actuating member pivotally secured to said second housing, said actuating members being pivotally secured to said coupling element, said actuating members each movable between a locked position and an unlocked position, said actuating members each having a camming surface thereon;
  a first locking member associated with said first end support and a second locking member associated with said second end support, said first and second locking members each having a tap plate with a generally planar head portion, adapted to be disposed within an associated one of said channels, and adapted to engage surfaces of said channels, said first and second locking members movable between an extended opened position and a retracted closed position; and
  a first generally planar biasing member for biasing said first locking member into said closed position and a second, generally planar biasing member for biasing said second locking member into said closed position;
wherein movement of said first actuating member from said locked position to said unlocked position by a user causes said first camming surface to urge said first locking member into said opened position against a biasing force provided by said first biasing member, said movement of said first actuating member is transferred to said second actuating member by said coupling element to cause said second actuating member to move from said locked position to said unlocked position, said movement of said second actuating member to said unlocked position causing said second camming surface to urge said second locking member into said opened position against a biasing force provided by said second biasing member to thereby simultaneously unlock both said first end support and said second end support from their respective said support rails;
wherein said tap plate includes a neck portion coupled to said head portion; and
wherein said head portion further comprises a plurality of serrated teeth.

14. The vehicle article carrier of claim 13, wherein said coupling element comprises a thin metal rod.

15. The vehicle article carrier of claim 13, said first housing and said second housing each comprising a T-lug portion having a first cutout and a second cutout respectively, said first locking member disposed within said first cutout and said second locking member disposed within said second cutout.

16. The vehicle article carrier of claim 13, said first end support and said second end support each comprising a T-lug portion, each said T-lug portion adapted to fit within a respective one of said channels to prevent said first end support and said second end support from being inadvertently removed from said support rails and to support said crossbar on said support rail.

17. The vehicle article carrier of claim 16, said T-lug portion of said first end support and said second end support further comprising at least two wheels to help guide said T-lug portion along its respective said channel for smooth, non-binding movement.

18. The vehicle article carrier of claim 13, said coupling element terminating in an L-shaped end at both a first end and a second end.

19. The vehicle article carrier of claim 18, said first actuating member and said second actuating member each comprising a blind hole that receives said L-shaped end.

20. The vehicle article carrier of claim 13, wherein said locking member is formed as a single piece unit from high strength metal.

* * * * *